(12) United States Patent
Patil et al.

(10) Patent No.: US 11,494,687 B2
(45) Date of Patent: Nov. 8, 2022

(54) GENERATING SAMPLES OF TRANSACTION DATA SETS

(71) Applicant: Yodlee, Inc., Redwood City, CA (US)

(72) Inventors: Deepak Chandrakant Patil, Dombivli (IN); Rakesh Kumar Ranjan, Bangalore (IN); Shibsankar Das, Bangalore (IN); Siddhartha Saxena, Bangalore (IN); Om Dadaji Deshmukh, Bangalore (IN)

(73) Assignee: Yodlee, Inc., San Mateo, CA (US)

( * ) Notice: Subject to any disclaimer, the term of this patent is extended or adjusted under 35 U.S.C. 154(b) by 1284 days.

(21) Appl. No.: 15/912,326

(22) Filed: Mar. 5, 2018

(65) Prior Publication Data

US 2019/0272482 A1 Sep. 5, 2019

(51) Int. Cl.
*G06N 20/00* (2019.01)
*G06F 16/35* (2019.01)

(52) U.S. Cl.
CPC ........... *G06N 20/00* (2019.01); *G06F 16/355* (2019.01)

(58) Field of Classification Search
None
See application file for complete search history.

(56) References Cited

U.S. PATENT DOCUMENTS

| | | |
|---|---|---|
| 2009/0234683 A1 | 9/2009 | Anderson et al. |
| 2014/0129561 A1 | 5/2014 | Kern et al. |
| 2014/0279299 A1 | 9/2014 | Erenrich |
| 2016/0078367 A1 | 3/2016 | Adjaoute |
| 2017/0140384 A1 | 5/2017 | Zoldi et al. |
| 2017/0206272 A1 | 7/2017 | Neela et al. |

OTHER PUBLICATIONS

PCT International Search Report and Written Opinion in International Application No. PCT/US2019/0020399, dated Jun. 14, 2019, 11 pages.
European Extended Search Report in European Appln. No. 19763674.9, dated Jan. 14, 2021, 11 pages.

*Primary Examiner* — Daniel T Pellett
(74) *Attorney, Agent, or Firm* — Fish & Richardson P.C.

(57) ABSTRACT

Methods, systems and computer program products generating diverse and representative set of samples from a large amount of transaction data are disclosed. A data sampling system receives transaction records. Each transaction record has multiple text segments. The system selects a subset of transaction records that contain least frequently appeared text segments. The system determines a respective vector representation for each selected transaction record. The system can measure similarity between transaction records based on the vector representations. The system assigns the selected transaction records to multiple clusters based on the vector representations and designated dimensions of importance. The system identifies one or more anchors that include transaction records on boundaries between clusters. The system filters the subset of transaction records by removing transaction records that are close to the anchors. The system then provides the filtered subset as a representative set of samples to a sample consumer.

20 Claims, 7 Drawing Sheets

GENERATING SAMPLES OF TRANSACTION DATA SETS

TECHNICAL FIELD

This disclosure relates generally to transaction data processing.

BACKGROUND

Transaction data can include transaction records describing transactions between service providers and customers. The service providers can include, for example, stores, hospitals, or financial institutions. The customers can include, respectively for example, shoppers, patients, or bank customers. The transaction records describing transactions can convey to end users various aspects of the transactions. For example, a merchant sales related transaction can have details such as the name of the merchant, the location of the merchant, the mode of payment and so on. Similarly, a cash withdrawal related transaction would have details such as the card details, ATM number, ATM location and so on. The transaction records can be in the form of seemingly unstructured text, where each transaction record includes multiple apparently free-form text segments. The text segments can be cryptic and difficult to understand by machines or humans. Some machine learning processes require training, where a small set, e.g., several millions, of transaction records are used as samples to represent a large amount, e.g., several billions, of transaction records. The small set is fed to classifiers to train the classifiers.

SUMMARY

Techniques of generating diverse and representative set of samples from a large amount of transaction data are disclosed. In some implementations, a data sampling system receives transaction records. Each transaction record has multiple text segments. The data sampling system selects a subset of transaction records that contain least frequently appeared text segments. The data sampling system determines a respective vector representation for each selected transaction record. The data sampling system can measure similarity between transaction records based on the vector representations. The data sampling system assigns the selected transaction records to multiple clusters based on the vector representations and designated dimensions of importance. The data sampling system identifies one or more anchors that include transaction records on boundaries between clusters. The data sampling system filters the subset of transaction records by removing transaction records that are close to the anchors. The data sampling system then provides the filtered subset as a representative set of samples to a sample consumer.

The features described in this specification can be implemented to achieve one or more advantages over conventional data sampling techniques. One of the common issues faced in conventional big data analytics setup is how to sample the data in such a way that the sampled instances are representative of the characteristics of the overall data population. Compared to conventional data sampling techniques, e.g., random sampling, the disclosed techniques can generate more diverse samples and more representative of the underlying data.

Sampling is important to optimize the computation cost of data analysis and model training. A large volume of the data in the overall population may be similar to each other, where a small portion of outliers are nonetheless important. This kind of redundancy in similar data does not help much in the learning process of the model and is best to be sifted through to save computational cost. Compared to conventional sampling techniques, the disclosed techniques are more efficient at filtering out redundant data while preserving representations of the outliers, thereby saving computing cost without sacrificing accuracy.

Machine learning techniques can be applied to extract meanings of the text segments. Quality of the classifiers may depend on quality of training. A diverse and representative sample set can train the classifiers better than a sample set that has transaction records that are similar to one another but only represent a small subset of the transactions. Efficient sampling is a critical requirement because it is assumed that the machine learning models trained on this sampled set and the insights generated hold true for the broader set. The sampling becomes more complex when the data is unstructured text. For example, in the case of numeric data, a sampler can estimate the range of values, e.g., between 0 and 10000. Given a set of values, a sampler can draw inferences about the region where they fall. For example, if a sampler has three samples: 101, 102 and 1005, the sampler can easily conclude that 101 and 102 are close to each other and both are very far from 1005. It is difficult for a conventional sampler to draw such consistent conclusions about the relative significance of three words, for example, "walmart," "ATM," and "tom." The disclosed techniques can determine words that are semantically close to one another rather than close to one another in form. For example, the disclosed techniques can determine that, of three words "sing," "sang" and "swing," "sing" and "sang" are close to one another and are not close to "swing." Such distinction can help ensure that a sample set is a diverse sample set for training.

The disclosed techniques can help ensure a sample set has high quality. The high quality sample data, in turn, can ensure the machine learning process trained on the sample data is an accurate and efficient process in determining meanings of sometimes cryptic shorthand or acronyms in transaction records.

The details of one or more implementations of the disclosed subject matter are set forth in the accompanying drawings and the description below. Other features, aspects and advantages of the disclosed subject matter will become apparent from the description, the drawings and the claims.

BRIEF DESCRIPTION OF THE DRAWINGS

Like reference symbols in the various drawings indicate like elements.

DETAILED DESCRIPTION

Figure 1:
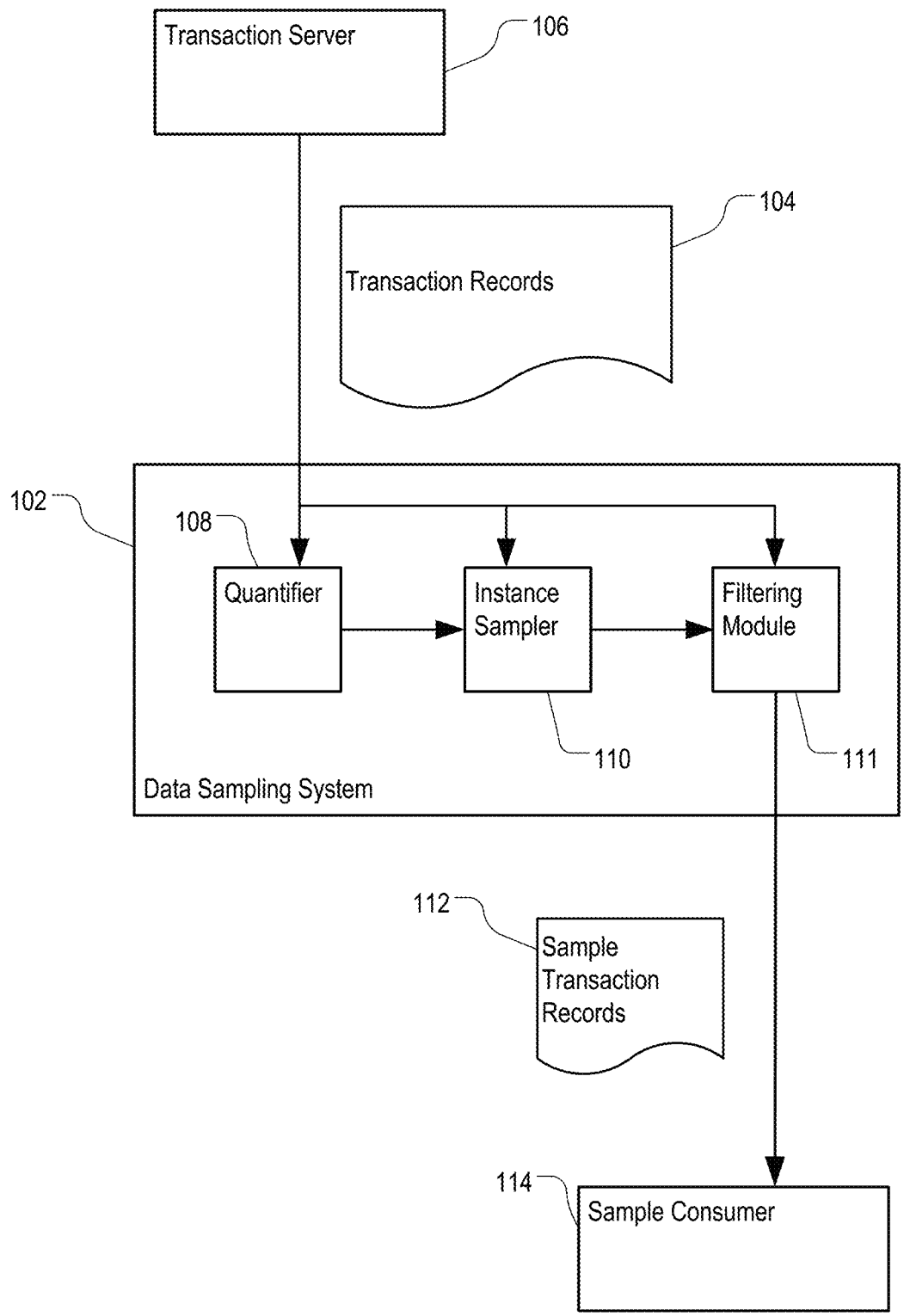
FIG. 1 is a block diagram illustrating an example data sampling system.

FIG. 1 is a block diagram illustrating an example data sampling system 102. Each component of the data sampling system 102 includes one or more processors programmed to perform various operations of data sampling. The data sampling system 102 can be implemented on one or more server computers, e.g., on a cloud-based computing platform.

The data sampling system 102 receives transaction data 104 from a transaction server 106. The transaction data 104 includes one or more transaction records describing transactions. A transaction can be an instance of interaction between a first user and a second user (e.g., between two humans), a user and a computer (e.g., a user and a point-of-sale (PoS) device at a financial institute or a store), or a first computer and a second computer (e.g., a PoS device and a bank computer). The transaction data 104 is collected and stored by the transaction server 106.

The transaction server 106 includes one or more storage devices storing the transactional data 104. Examples of a transaction server 106 include a log server, an action data store, or general ledger management computers of various service providers. The service providers, also referred to as merchants, can include, for example, an interactive content provider, e.g., a news provider that allows readers to posts comments, an on-line shop that allows users to buy goods or services, e.g., prescription medicine or pet food, a healthcare network that serves new and existing patients, or a financial services provider, e.g., a bank or credit card company that tracks financial transactions.

Each transaction record in the transaction data 104 can include metadata and a description of a transaction. The description can be a text string having a sequence of text segments. Each text segment, also referred to as a word, is separated from other text segments by a delimiter, e.g., a space or a tab. Descriptions in the transaction data 104 can convey to the end user the nature of the transaction. For example, a merchant-spend related transaction would have details such as the name of the merchant, the location of the merchant, the mode of payment and so on. Similarly, a cash withdrawal related transaction would have details such as the card details, ATM number, ATM location and so on. Text segments can include abbreviations, short-hands, codes that may be difficult to understand.

The data sampling system 102 can receive a large amount of transaction data 104, e.g., tens or hundreds of millions of transaction records, in a given period, e.g., a day. The data sampling system 102 is configured to select a small portion of the transaction records in the transaction data 104 to form a representative sample set. Conventional sampling techniques may implement random sampling. Random sampling may not always produce a representative set of transaction records because a small number of outliers, important in training a classifier, may not be picked up by random sampling.

The transaction data 104 can be dynamic in nature. For example, formats of the transaction data 104, in addition to being diverse from one another, can change over time, as frequently as on a daily basis. Such changes are referred to in this specification as drift. The data sampling system 102 is configured detect such drift and adapt itself so that the sampled instances continue to be representatives of the overall data population.

The data sampling system 102 can detect the drift and produces a representative sample by periodically performing operations including quantifying text in the transaction data 104, performing instance sampling on the transaction data 104, and filtering the resulting samples. The data sampling system 102 includes a quantifier 108 configured to perform the quantifying operations, including converting text into vector representations. The data sampling system 102 includes an instance sampler 110 configured to perform the instance sampling operations. Additional details of the operations of the quantifier 108 and the instance sampler 110 are described below in reference to FIG. 2A and FIG. 3, respectively.

The data sampling system 102 includes a filtering module 111. The filtering module 111 is a component of the data sampling system 102 configured to filter transaction records in the transaction data 104 based on outputs of the quantifier 108 and the instance sampler 110. The filtering module can generate a set of sample transaction records 112. The set of sample transaction records 112 can include a small number, e.g., several millions, or X percent, of transaction records that are diverse and representative of the transaction data 104. In particular, the set of sample transaction records 112 can include transaction records having text segments that do not commonly occur in most transaction record and are likely to have been missed by a conventional random sampler.

The data sampling system 102 can provide the set of sample transaction records 112 to a sample consumer 114. The sample consumer 114 can include one or more computers configured to perform various analysis on the transaction data 104. In particular, in some implementations, the sample consumer 114 can use the sample data to train one or more classifiers in a machine learning process for extracting meanings from the transaction records. For example, the sample consumer 114 can train a classifier to understand that a text segment "Walmart" is a store name, or a particular transaction record represents a deposit at an ATM.

Figure 2A:
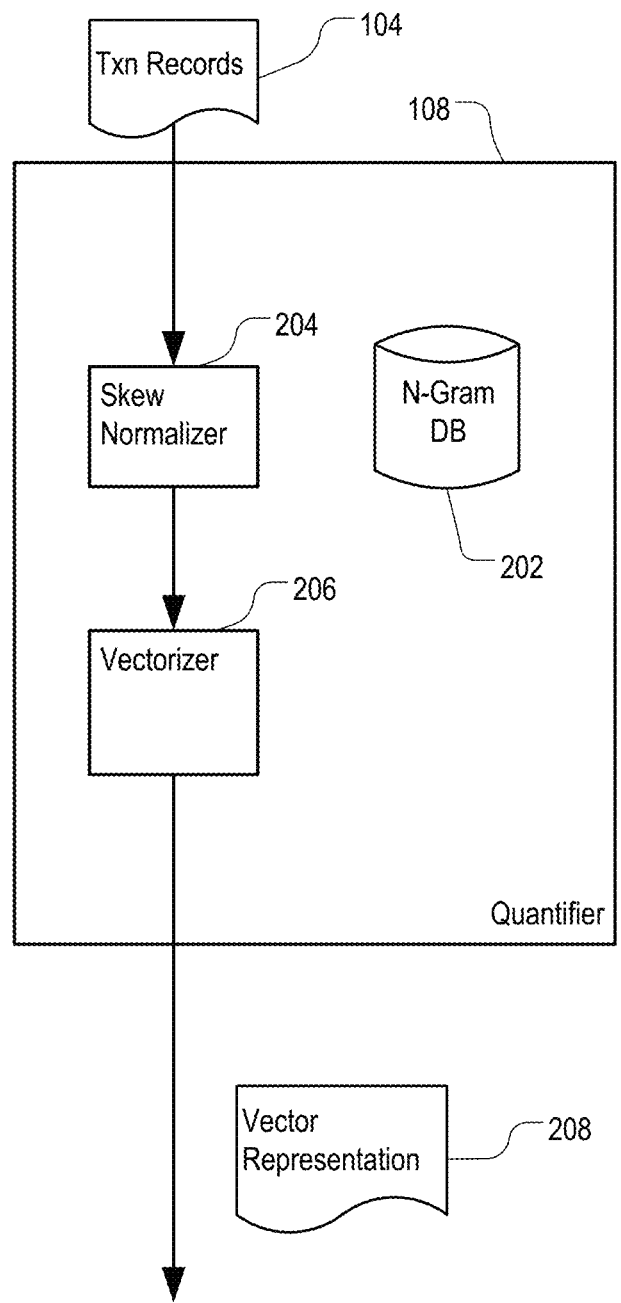
FIG. 2A is a block diagram illustrating an example quantifier of a data sampling system.

FIG. 2A is a block diagram illustrating an example quantifier 108 of a data sampling system. The data sampling system can be the data sampling system 102 described in reference to FIG. 1. The quantifier 108 is configured to generate a quantitative representation, e.g., a vector representation, of a transaction record in the transaction data 104.

In some implementations, the quantifier 108 can represent a transaction record using a bag-of-words model. The quantifier 108 first forms a dictionary of all the words or n-grams, e.g., ordered set of n-words in a database 202. Assume that the number of words (or n-grams) is D. Each transaction record is then represented by a D-dimensional vector where the i-th element of the vector is the count of the i-th word in the transaction record. Such a representation typically does not capture semantic closeness of words (e.g., "sing" and "sang" are closer to each other than "sing" and "swing"). However, this implementation is a computationally easy process and has no particular bias towards frequently occurring words.

In some other implementations, the quantifier 108 can use multi-layer neural network models configured to produce word embeddings. An example of such a model is the word2vec representation. In such implementations, the quantifier 108 can use a feed forward neural network to optimize the probability of predicting a particular word given a set of its adjacent words. Adjacency is defined as plus or minus X words in the neighborhood of a particular word. Accordingly, by using word2vec, the quantifier 108 captures the contexts in which words occur. Semantically similar words will occur in similar context and will thus have word2vec representations which are closer to each other. Such implementations, typically modelled as a feed forward neural network, largely involves matrix multiplication and is thus computationally efficient.

In such implementations, the quantifier 108 can train a word2vec model on a relatively small set, e.g., several millions, of transaction records within a short period of time and on relatively inexpensive computational power. For example, the quantifier 108 can train a word2vec model on approximately 30 million transaction records using a vocabulary of approximately 30 thousand words, which can be the most frequent 30 thousand words. The quantifier 108 can represent each word by a 512-dimensional vector. A transaction record is represented by taking the average of the word2vec representation of its constituent words. The distribution of words in the transaction data 104 can be skewed with a small proportion of data occurring with extremely high frequency. This skew in the transaction data 104 may affect the learnt word2vec models. To overcome this, the quantifier 108 can implement skew-normalized sampling of the transaction data 104.

For the skew-normalized sampling, the quantifier 108 can operate as follows. A skew normalizer 204 of the quantifier 108 increases the population of less-occurring words in the sample relative to the transaction data 104. The skew normalizer 204 can sample the transaction records in the transaction data 104 in such a way that skew normalizer 204 first populates descriptions with the less frequently occurring words and gradually populating the more frequent words.

Figure 2B:
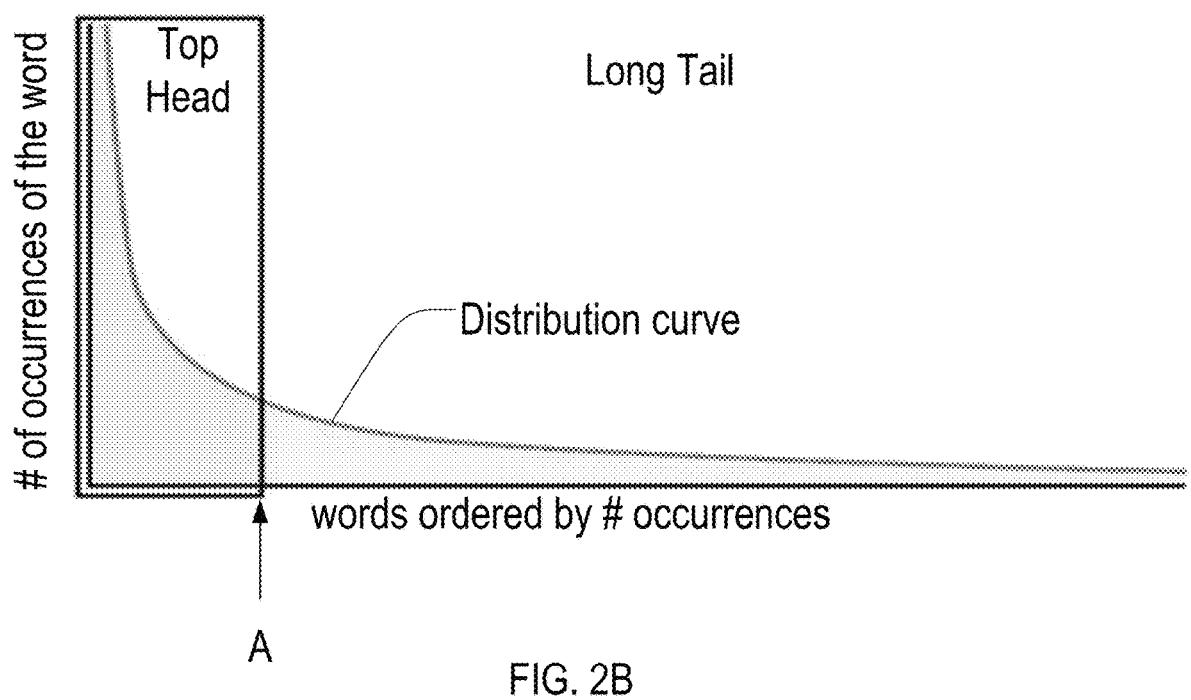
FIG. 2B is a schematic graph of a population distribution of words in a set of transaction data.

In general, referring to FIG. 2B, a word population distribution tends to follow a power law, e.g., the frequency of words falls off exponentially, so a few words are very frequent, but the majority of words are infrequent. Thus, a word population distribution can be divided into a top head that includes the more frequently used words, and a long-tail that includes the less-frequently occurring words. In some implementations, the population of less-frequently occurring words in the training sample can be increased (relative to the rate in the transaction data) by populating at least a portion of the training sample by randomly sampling transaction from only those transactions that include at least one word from the long tail.

For example, the programmer or operator can select a cut-off (shown by arrow A) between the top head and the long tail such that at least a majority of word population (i.e., the area under the distribution curve) is within the top head. For example, the cut-off location is selected so that 65-90%, e.g., about 80%, of the word population is within the top head. This percentage can be based on practical experience with word distribution and the power law curve for a particular application. As practical matter, the top head can include about 1000 words.

The skew normalizer 204 selects a portion of the total sample only from transactions that have at least one word in the long tail. This assures that at least that this portion of the sample contains at least one word from the tail. In some implementations, the portion is 50%, but the portion could be higher or lower, e.g., 30-70%. The percentage can be set by the programmer or operator.

The skew normalizer 204 can randomly select the remainder of the sample from all of the transactions. For example, if 50% of the sample is selected from only transactions that include at least one word in the long tail, the remaining 50% of the sample is selected from all of the transactions. In general, no matter what the percentage, by deliberately selecting a portion from transactions that have at least one word in the tail (and selecting the remainder from the full sample), the representation of words from the tail will be boosted during training. The resultant word distribution from the output of the skew normalizer 204 has less bias towards the most frequent words. The operations of the skew normalizer 204 thus help generate a broader representation of words and transaction records for quantifying each word.

A vectorizer 206 of the quantifier 108 can quantify each word using word2vec techniques. This sampling suffices for word2vec representation because word2vec is not computationally expensive and hence can afford to have many more samples than actually used for model training. In addition, the word2vec representation forms only the initial layer of quantitative representation of the data and not the actual data modelling. The vectorizer 206 can provide a vector representation 208 of the transaction records to an instance sampler for further processing.

Figure 3:
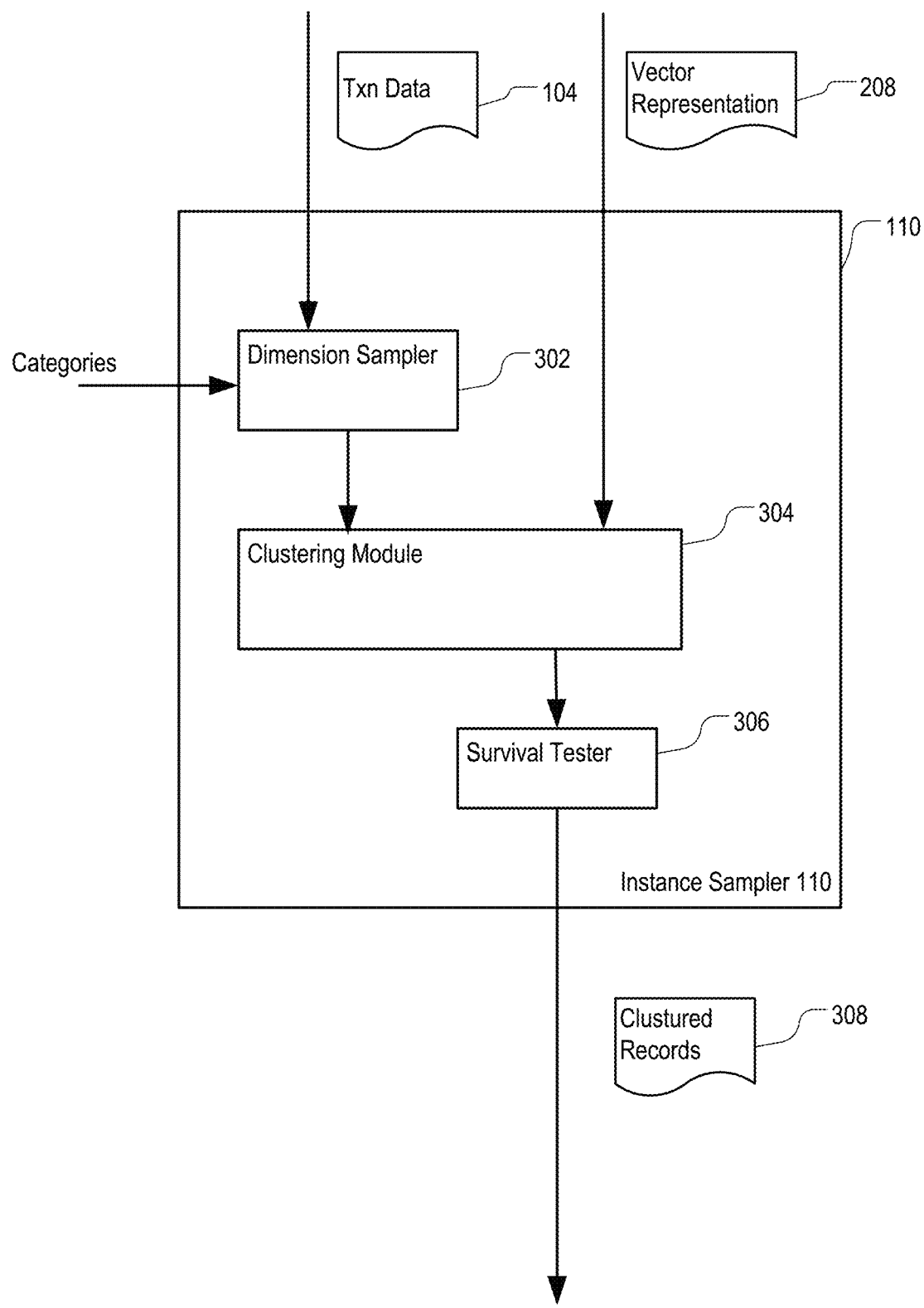
FIG. 3 is a block diagram illustrating an example instance sampler of a data sampling system.

FIG. 3 is a block diagram illustrating an example instance sampler 110 of a data sampling system. The instance sampler 110 and its components can be implemented on one or more computer processors. The instance sampler 110 can perform instance sample by performing dimension sampling using a dimension sampler 302. The dimension sampler 302 is a component of the instance sampler 110 configured to sample transaction data 104 along designated dimensions of importance.

The dimension sampler 302 can designate the various dimensions of importance. The dimensions of importance can include word distribution. To sample along the word distribution dimension, the dimension sampler 302 samples in such a way that words in the long tail, which are words with relatively less frequency of occurrence compared to other words in the transaction data 104, are represented in at least a configured threshold amount, e.g., 50%, of the transaction records.

The dimensions of importance can include length of description. To sample along the length of description dimension, the dimension sampler 302 samples in such a way that a configured threshold amount, e.g., 30%, of the samples are from descriptions having more than a specified number, e.g., 100, of characters and the rest are from all descriptions. The specified number of characters is a limit that was decided by sampling distributions over a process window, e.g., a 30-day window and analyzing their character distribution.

The dimensions of importance can include transaction type. To sample along the transaction type dimension, the dimension sampler 302 can sample based on different types of transaction, e.g., credit vs. debit, as detected from the transaction data 104. The dimension sampler 302 can sample proportionate descriptions from a first type of transaction, e.g., credit where money in-flow is recorded, and from a second type of transaction, e.g., debit, where money out-go is recorded.

The dimensions of importance can include modes of transaction. The modes of transaction can correspond to a financial card type, e.g., a debit card transaction, a credit card transaction, a reward card transaction, or a gift card transaction. To sample along the modes of transaction dimension, for example, the dimension sampler 302 samples proportionate descriptions from bank-card and credit-card based transactions.

The dimensions of importance can include categories of transactions. The word composition of a description may depend on the category that the transaction belongs to. The categories can be pre-specified categories from domain experts, e.g., business experts. For example, a description related to a "salary" category can be unique and distinct from a description related to a "refunds" category or a "cash withdrawal" category. Domain experts can identify, from historical transaction data, a large number, e.g., hundreds, of such categories. The dimension sampler 302 can label at least some, e.g., several millions of, transactions sampled using the other dimensions of importance one of these categories as labels based on input from the domain experts. The dimension sampler 302 can designate these transaction records as labeled data.

A clustering module 304 of the instance sampler 110 receives the labeled data. The clustering module 304 is a component configured to cluster the labeled data into clusters. In some implementations, each cluster corresponds to a respective category. To cluster the labeled data, the clustering module 304 represents each transaction record by an average of word2vec representation of each of its constituent words. The clustering module 304 then calculates a distance, e.g., a Euclidean distance, between each pair of these representations of the transaction records. The clustering module 304 uses the Euclidean distances as the metric for clustering the transaction records. The clustering module 304 then computes a respective centroid for each of the clusters.

Based on the clusters, a survival tester 306 creates a data set including a collection of transaction records. The survival tester 306 is a component of the instance sampler 110 configured to create the collection of transaction record from both randomly selected transaction records and transaction records that satisfy a word diversity survival test. In some implementations, the survival tester 306 can create a large collection that includes, for example, 40 million transaction records where a first portion, e.g., 50% or 20 million, transaction records are randomly selected, and where the rest, e.g., the other 50% and 20 million, transaction records are selected after performing the word diversity survival test.

The survival tester 306 can de-prioritize transaction records that have frequently occurring words by performing the word diversity survival test. Performing the word diversity survival test includes performing the following operations. For each sampled description, the survival tester 306 computes an average probability of each of its constituent word being observed. The survival tester 306 can learn these probabilities from the dataset used to learn the word2vec representation. The survival tester 306 can designate the average of these probabilities as the probability of seeing the particular transaction record. The survival tester 306 can designate each transaction record having a probability score that is greater than a threshold value, e.g., 0.5, as having failed the word-diversity-survival test. The survival tester 306 rejects these failed transaction records. Accordingly, the survival tester 306 ensures that the samples that survive are not from the sample pool on which the word2vec representation was trained. The survival tester 306 assigns each surviving transaction record to a corresponding cluster the centroid of which is closest to the transaction record. The survival tester 306 then provides the clustered transaction records 308 to a filtering module for further processing. Operations of the filtering module are described below in reference to FIG. 4.

Figure 4:
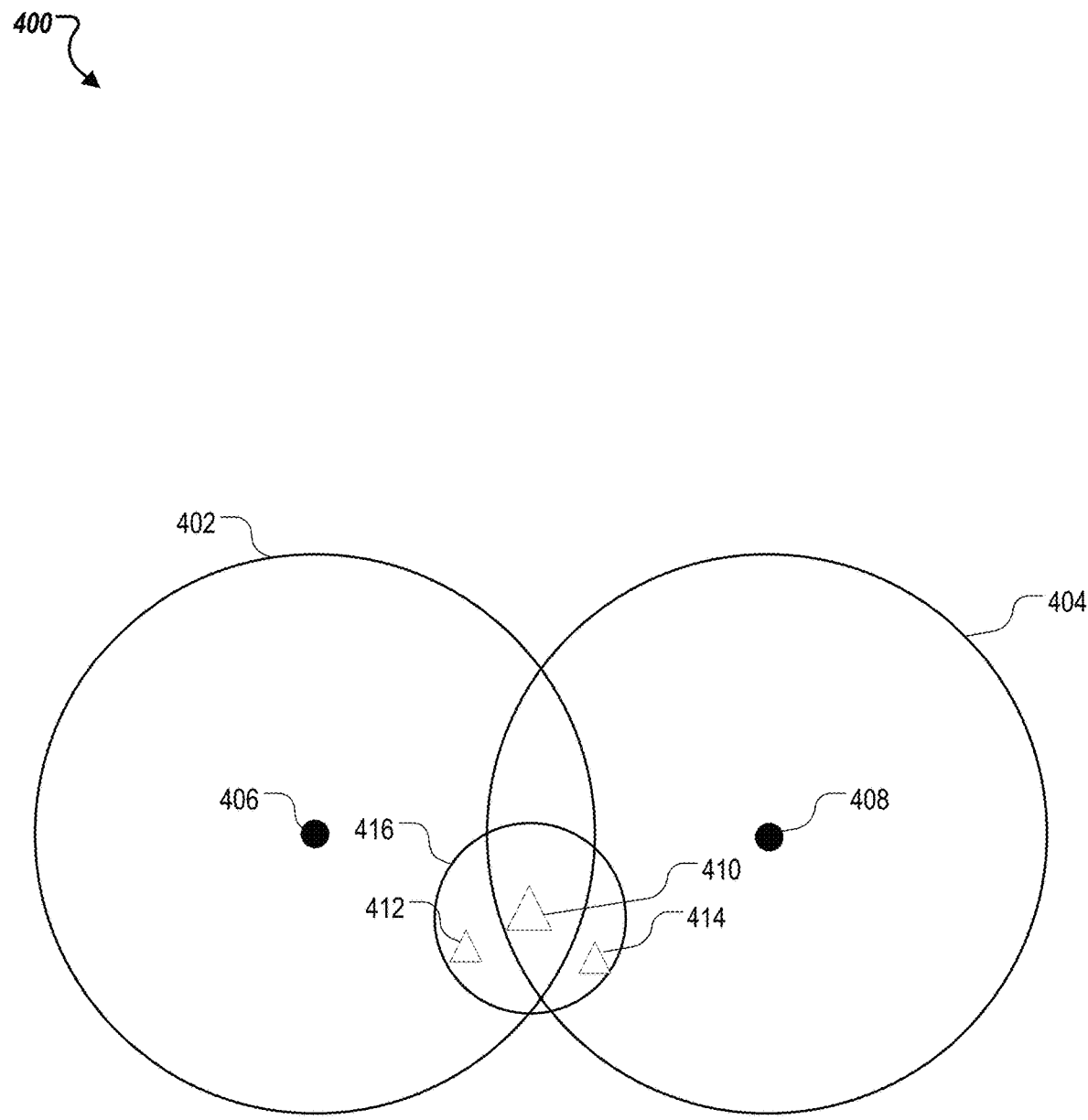
FIG. 4 is a diagram illustrating example techniques of filtering sample data based on anchors.

FIG. 4 is a diagram illustrating example techniques of filtering sample data based on anchors. The operations of filtering sample data based on anchors can be performed by a filtering module implemented on one or more computer processors, e.g., the filtering module 111 of FIG. 1.

The sample data includes clustered transaction records 308 of FIG. 3. For simplicity, two clusters, cluster 402 and cluster 404, are shown. Each of the cluster 402 and cluster 404 has a respective centroid, e.g., centroid 406 and centroid 408, respectively.

The filtering module designates one or more transaction records in the cluster as boundary transaction records. The filtering module can define boundary transaction records as ones whose distance from the closest cluster centroid is within a certain threshold margin, e.g., 10%, of their distances to the second closest cluster. For example, the filtering module can determine that a Euclidian distance between a transaction record 410 and a first centroid 406 of a first cluster 402 is X, and that a Euclidian distance between the transaction record 410 and a second centroid 408 of a second cluster 404 is Y. The filtering module can determine that the transaction record 410 is a boundary transaction record in response to determining that X and Y are within the threshold margin of one another.

The filtering module selects anchor samples from the boundary transaction records. For example, from within the boundary transaction records, the filtering module can randomly select a portion, e.g., 10%, of transaction records as anchor samples. The filtering module can also label all the transaction records with original category labels as anchor samples. The filtering module can designate these anchor samples as being representative of the overall data distribution. The filtering module can then actively drop transaction records, including other anchor samples, that are within a given distance from any of these anchor samples.

For example, the filtering module can randomly select the transaction record 410 as an anchor sample. The filtering module can calculate a respect distance, e.g., a $\delta$-ball distance, between each transaction record and the transaction record 410. The filtering module can determine that transaction records 412 and 414 are within a threshold distance 416 from the transaction record 410. In response, the filtering module can drop the transaction records 412 and 414 from the samples.

The filtering module can determine $\delta$ value based on a 3-sigma distance value, assuming an exponential distribution of the distances between all possible pairs of transaction record. This process is a sequential greedy procedure and thus the outcome depends on the anchor sample that the filtering module start with. The filtering module can include samples that survive this dropping process in the representative data.

The filtering module can apply the above process to new samples received periodically, e.g., on a daily basis. The filtering module thus determines whether the new samples get dropped or added to the representative data set. Periodically, e.g., on a monthly basis, the entire clustering process is repeated which leads to new cluster centroids, new boundary samples and hence new "anchor" samples. Similarly, the filtering module can replace a portion, e.g., 10%, of samples from the category-labeled data with new category-labeled data on a periodical, e.g., monthly, basis. This procedure can lead to quickly capturing transaction records with diverse set of words while not losing the category variations. The periodical processing new transaction data can capture drifts in the data.

Figure 5:
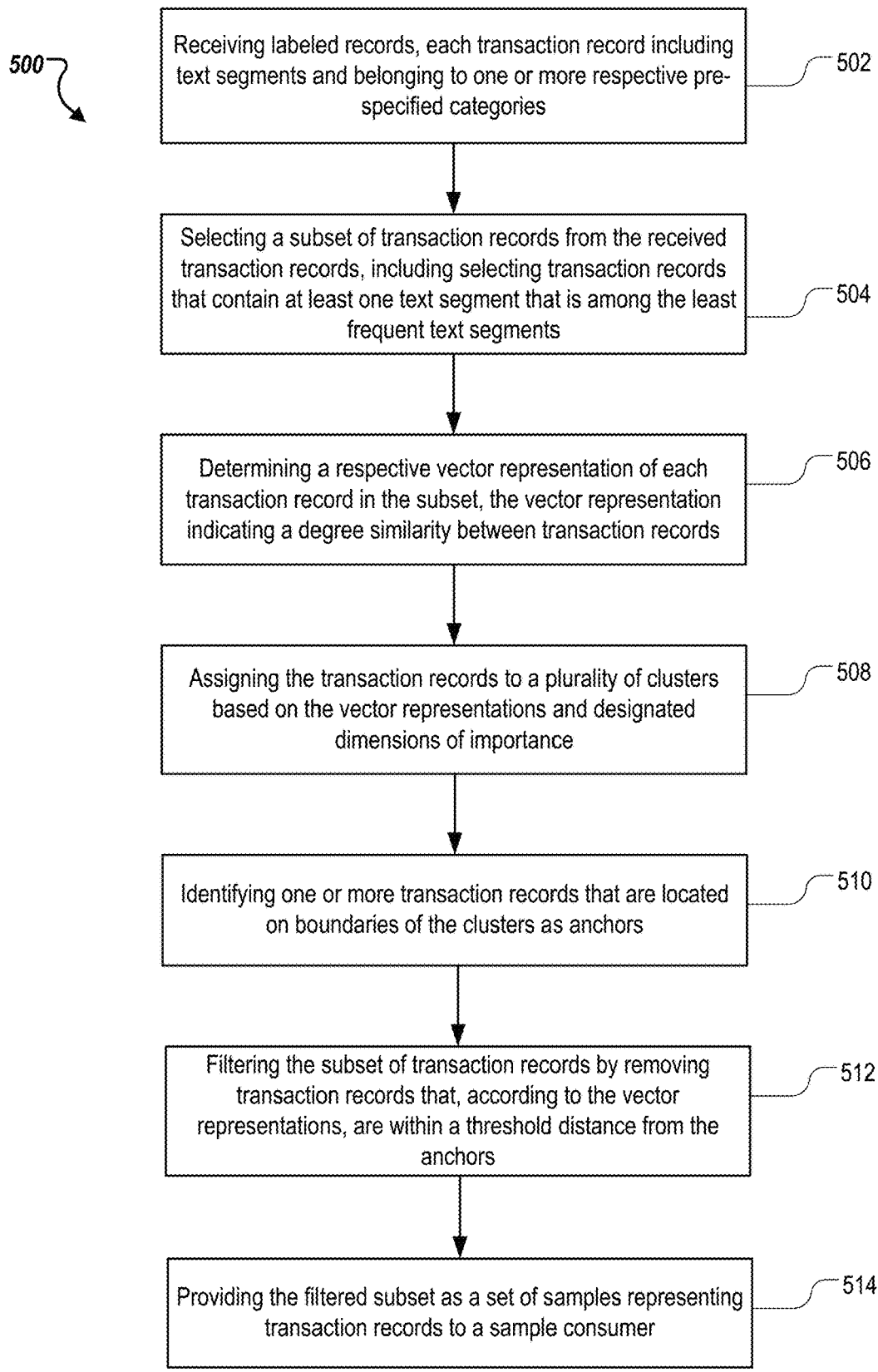
FIG. 5 is a flowchart illustrating an example process of online sampling techniques.

FIG. 5 is a flowchart illustrating an example process 500 of online sampling analysis. The process 500 can be performed by a system having one or more computer processors, e.g., the data sampling system 102 of FIG. 1.

The system receives (502) transaction records. Each transaction record includes multiple text segments and belonging to one or more respective pre-specified categories.

The system selects (504) a subset of transaction records from the received transaction records. In particular, the system selects transaction records that contain at least one text segment that is among the least frequent text segments of the text segments, e.g., a group of text segments where each text segment in the group is less frequent than any text segment outside of the group. Selecting the subset of transaction records can include the following operations. The system can select a first portion of the subset of transaction records from transaction records that contain text segments that are among the least frequent text segments, e.g., the least frequent 1000 words. The system then selects a second portion of the subset of transaction record randomly from the received transaction records. The ratio between the first portion and the second portion satisfies a pre-specified threshold, e.g., 50% and 50%, or some other ratio.

The system determines (506) a respective vector representation of each transaction record in the subset. The vector representation can indicate a degree similarity between the transaction records. The vector representation can be modelled as a feed forward neural network that optimizes a probability of predicting a particular text segment given a set of adjacent text segments. Each text segment can be represented as a multi-dimensional vector. For example, the vector representation can be a word2vec representation.

The system assigns (508) the transaction records to multiple clusters based on the vector representations and designated dimensions of importance. Assigning the transaction records to the clusters can include the following operations. The system performs instance sampling on the transaction records along the designated dimensions of importance. The system determines Euclidean distances between the vector representations of the transaction records. The system then clusters the transaction records using a metric of the Euclidean distances. The designated dimensions of importance can include one or more of the following: text segment distribution; length of the transaction records; credit versus debit; modes of transaction; or category of transactions.

The system identifies (510) identifying one or more transaction records that are located on boundaries of the clusters as anchors. Identifying one or more transaction records that are located on boundaries of the clusters as anchors can include the following operations. The system can designating transaction records whose distances from a centroid of a closest cluster is within a threshold difference from distances from a centroid of a second closest cluster as boundary transaction records. The system can then select at least a portion of the boundary transaction records as the anchors.

The system filters (512) the subset of transaction records by removing transaction records that, according to the vector representations, are within a threshold distance from the anchors. The threshold distance can be a δ-ball distance. The δ value can be determined based on a three-sigma value assuming an exponential distribution of distances between pairs of transaction records.

The system provides (514) the filtered subset as a set of samples representing transaction records to a sample consumer. The received transaction records can be selectively added to the set of samples according to a first time schedule, e.g., a daily schedule. The method can be repeated according to a second time schedule, e.g., a biweekly or monthly schedule, to catch any drift in data.

Exemplary System Architecture

Figure 6:
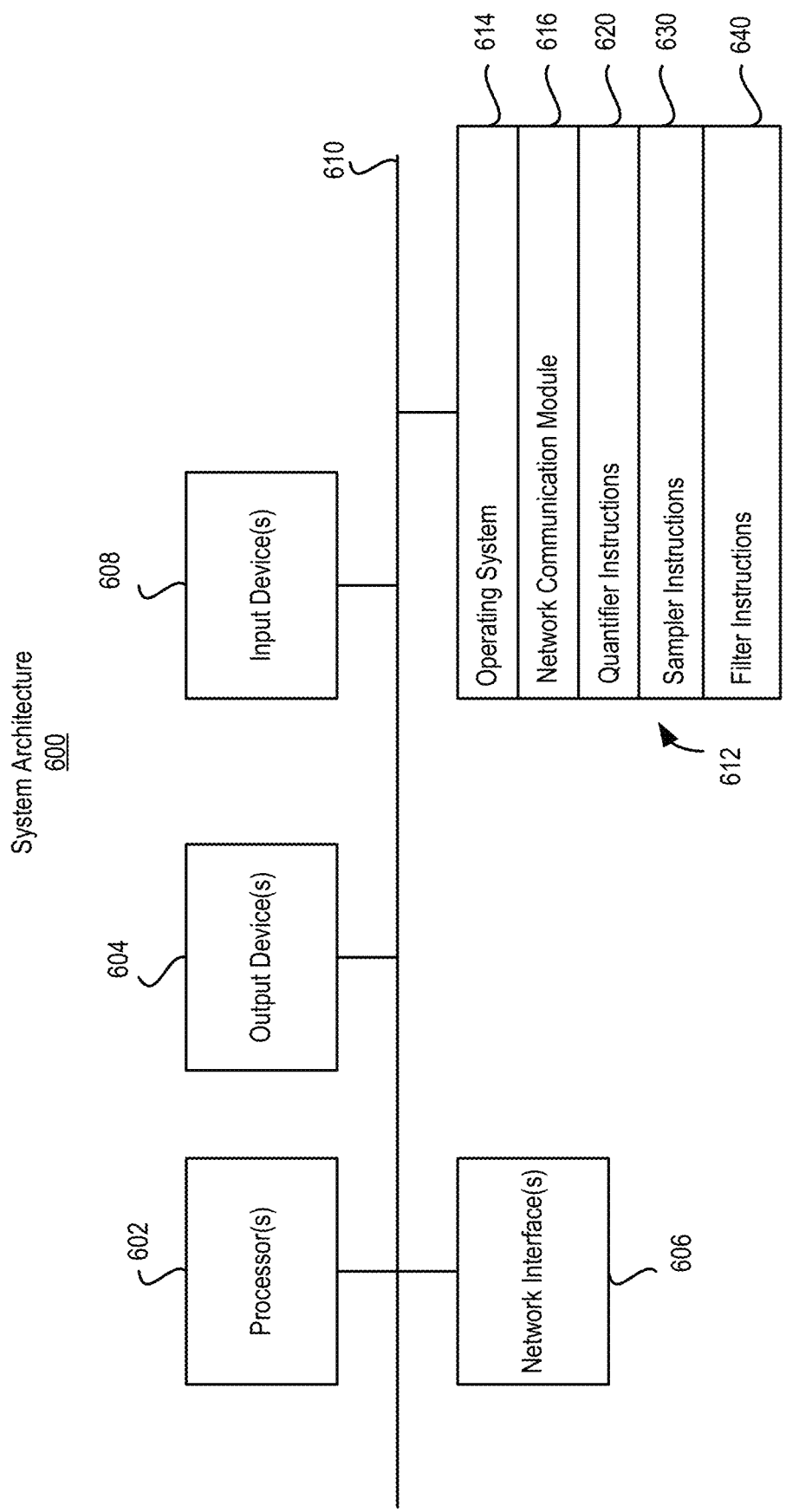
FIG. 6 is a block diagram illustrating an example system architecture for implementing the features and operations described in reference to FIGS. 1-5.

FIG. 6 is a block diagram of an example system architecture for implementing the systems and processes of FIGS. 1-5. Other architectures are possible, including architectures with more or fewer components. In some implementations, architecture 600 includes one or more processors 602 (e.g., dual-core Intel® Xeon® Processors), one or more output devices 604 (e.g., LCD), one or more network interfaces 606, one or more input devices 608 (e.g., mouse, keyboard, touch-sensitive display) and one or more computer-readable mediums 612 (e.g., RAM, ROM, SDRAM, hard disk, optical disk, flash memory, etc.). These components can exchange communications and data over one or more communication channels 610 (e.g., buses), which can utilize various hardware and software for facilitating the transfer of data and control signals between components.

The term "computer-readable medium" refers to a medium that participates in providing instructions to processor 602 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 612 can further include operating system 614 (e.g., a Linux® operating system), network communication module 616, quantifier instructions 620, sampler instructions 630 and filter instructions 640. Operating system 614 can be multi-user, multiprocessing, multitasking, multithreading, real time, etc. Operating system 614 performs basic tasks, including but not limited to: recognizing input from and providing output to devices 606, 608; keeping track and managing files and directories on computer-readable mediums 612 (e.g., memory or a storage device); controlling peripheral devices; and managing traffic on the one or more communication channels 610. Network communications module 616 includes various components for establishing and maintaining network connections (e.g., software for implementing communication protocols, such as TCP/IP, HTTP, etc.).

Quantifier instructions 620 can include computer instructions that, when executed, cause processor 602 to perform the operations of the quantifier 108 of FIG. 1, including quantifying transaction data into vector representations. Sampler instructions 630 can include computer instructions that, when executed, cause processor 602 to perform the operations of the instance sampler 110 of FIG. 1, including clustering and sampling transaction data. Filter instructions 640 can include computer instructions that, when executed, cause processor 602 to perform the operations of the filtering module 111 of FIG. 1, including filtering the samples.

Architecture 600 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer.

Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user. The computer can have a touch surface input device (e.g., a touch screen) or a keyboard and a pointing device such as a mouse or a trackball by which the user can provide input to the computer. The computer can have a voice input device for receiving voice commands from the user.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the invention have been described. Nevertheless, it will be understood that various modifications can be made without departing from the spirit and scope of the invention.

What is claimed is:

1. A method comprising:

receiving a first plurality of transaction records, each transaction record including a plurality of text segments;

selecting a subset of transaction records from the first plurality of transaction records, including selecting one or more transaction records that each contain at least one text segment that is in a set of least frequent text segments of the text segments of the first plurality of transaction records, wherein each text segment in the set of least frequent text segments appears less frequently in the first plurality of transaction records than any text segment of the text segments of the first plurality of transaction records, that is not in the set of least frequent text segments;

for each transaction record in the subset, determining, using a trained machine learning model, a machine-learned vector representation of the transaction record, wherein the machine-learned vector representations indicate a degree similarity between the respective transaction records, and wherein the machine learning model has been trained by processing a training data set comprising a second plurality of transaction records;

assigning the transaction records in the subset to a plurality of clusters based on at least the machine-learned vector representations;

identifying one or more transaction records in the subset that are located on boundaries of the clusters as anchors;

filtering the subset of transaction records by removing one or more transaction records that, according to the machine-learned vector representations, are within a threshold distance from the anchors; and providing the filtered subset as a set of samples representing the first plurality of transaction records to a sample consumer.

2. The method of claim 1, wherein selecting the subset of transaction records comprises:

selecting a first portion of the subset of transaction records from transaction records, in the first plurality of transaction records, that contain text segments that are in the set of least frequent text segments; and selecting a second portion of the subset of transaction records randomly from the first plurality of transaction records, wherein a ratio between the first portion and the second portion satisfies a pre-specified threshold.

3. The method of claim 1, wherein determining, using the trained machine learning model, the machine-learned vector representation of a transaction record in the subset comprises:

determining, for each text segment in the transaction record, a machine-learned vector representation of the text segment, wherein the machine-learned vector representations of the text segments have been generated using the trained machine learning model, and wherein the trained machine learning model is a feed forward neural network that has been configured through training using the second plurality of transaction records to optimizes a probability of predicting a particular text segment given a set of adjacent text segments; and combining the machine-learned vector representations of the text segments in the transaction record to generate the machine-learned vector representation of the transaction record.

4. The method of claim 1, wherein the plurality of clusters have been generating by performing operations comprising:

receiving a third plurality of transaction records;

instance sampling the third plurality of transaction records along one or more designated dimensions of importance;

determining Euclidean distances between respective machine-learned vector representations of the instance-sampled transaction records; and clustering the instance-sampled transaction records using a metric of the Euclidean distances.

5. The method of claim 4, wherein the designated dimensions of importance comprise at least one of:

text segment distribution;
length of the transaction records;
credit versus debit;
modes of transaction; or
category of transactions.

6. The method of claim 1, wherein identifying one or more transaction records in the subset that are located on boundaries of the clusters as anchors comprises:

designating transaction records in the subset whose distances from a centroid of a closest cluster is within a threshold difference from distances from a centroid of a second closest cluster as boundary transaction records; and selecting at least a portion of the boundary transaction records as the anchors.

7. The method of claim 1, wherein the threshold distance is a $\delta$-ball distance, the $\delta$ value being determined based on a three-sigma value assuming an exponential distribution of distances between pairs of transaction records.

8. The method of claim 1, wherein received transaction records are selectively added to the set of samples according to a first time schedule, and a new plurality of clusters is generated according to a second time schedule.

9. The method of claim 1, wherein the first plurality of transaction records and the second plurality of transaction records are not the same.

10. The method of claim 1, wherein selecting one or more transaction records that each contain at least on text segment that is among the set of least frequent text segments comprises, for each of the one or more transaction records:

determining a respective probability value for each text segment in the transaction record;

combining the probability values for the text segments to generate a combined probability value for the transaction record; and determining that the combined probability value is below a threshold probability value, indicating that at least one of the text segments of the transaction record has a respective probability value that is below the threshold probability value.

11. A computer program product comprising one or more non-transitory storage devices storing instructions that are operable, when executed by one or more computers, to cause the one or more computers to perform operations comprising:

receiving transaction records, each transaction record including a plurality of text segments;

selecting a subset of transaction records from the received transaction records, including selecting one or more transaction records that each contain at least one text segment that is in a set of least frequent text segments of the text segments of the received transaction records, wherein each text segment in the set of least frequent text segments appears less frequently in the received transaction records than any text segment, of the text segments of the received transaction records, that is not in the set of least frequent text segments;

for each transaction record in the subset, determining, using a trained machine learning model, a machine-learned vector representation of the transaction record, wherein the machine-learned vector representations indicate a degree similarity between the respective transaction records;

assigning the transaction records in the subset to a plurality of clusters based on at least the machine-learned vector representations;

identifying one or more transaction records in the subset that are located on boundaries of the clusters as anchors;

filtering the subset of transaction records by removing one or more transaction records that, according to the machine-learned vector representations, are within a threshold distance from the anchors; and providing the filtered subset as a set of samples representing the received transaction records to a sample consumer.

12. The computer program product of claim 11, wherein selecting the subset of transaction records comprises:

selecting a first portion of the subset of transaction records from transaction records, in the received transaction records, that contain text segments that are in the set of least frequent text segments; and selecting a second portion of the subset of transaction record randomly from the received transaction records, wherein a ratio between the first portion and the second portion satisfies a pre-specified threshold.

13. The computer program product of claim 11, wherein determining, using the trained machine learning model, the machine-learned vector representation of a transaction record in the subset comprises:
- determining, for each text segment in the transaction record, a machine-learned vector representation of the text segment, wherein the machine-learned vector representations of the text segments have been generated using the trained machine learning model, and wherein the trained machine learning model is a feed forward neural network that has been configured through training to optimizes a probability of predicting a particular text segment given a set of adjacent text segments; and
- combining the machine-learned vector representations of the text segments in the transaction record to generate the machine-learned vector representation of the transaction record.

14. The computer program product of claim 11, wherein the plurality of clusters have been generating by performing operations comprising:
- receiving second transaction records;
- instance sampling the second transaction records along one or more designated dimensions of importance;
- determining Euclidean distances between respective machine-learned vector representations of the instance-sampled second transaction records; and
- clustering the instance-sampled second transaction records using a metric of the Euclidean distances.

15. The computer program product of claim 14, wherein the designated dimensions of importance comprise at least one of:
- text segment distribution;
- length of the transaction records;
- credit versus debit;
- modes of transaction; or
- category of transactions.

16. The computer program product of claim 11, wherein identifying one or more transaction records in the subset that are located on boundaries of the clusters as anchors comprises:
- designating transaction records in the subset whose distances from a centroid of a closest cluster is within a threshold difference from distances from a centroid of a second closest cluster as boundary transaction records; and
- selecting at least a portion of the boundary transaction records as the anchors.

17. The computer program product of claim 11, wherein the threshold distance is a δ-ball distance, the δ value being determined based on a three-sigma value assuming an exponential distribution of distances between pairs of transaction records.

18. The computer program product of claim 11, wherein received transaction records are selectively added to the set of samples according to a first time schedule, and a new plurality of clusters is generated according to a second time schedule.

19. A system comprising:
- one or more computers; and
- one or more storage devices which store instructions that are operable, when executed by the one or more computers, to cause the one or more computers to perform operations comprising
  - receiving transaction records, each transaction record including a plurality of text segment;
  - selecting a subset of transaction records from the received transaction records, including selecting one or more transaction records that each contain at least one text segment that is in a set of least frequent text segments of the text segments of the received transaction records, wherein each text segment in the set of least frequent text segments appears less frequently in the received transaction records than any text segment, of the text segments of the received transaction records, that is not in the set of least frequent text segments;
  - for each transaction record in the subset, determining a respective vector representation of the transaction record, wherein the vector representations indicate a degree similarity between the respective transaction records;
  - assigning the transaction records in the subset to a plurality of clusters based on at least the vector representations;
  - identifying one or more transaction records in the subset that are located on boundaries of the clusters as anchors;
  - filtering the subset of transaction records by removing one or more transaction records that, according to the vector representations, are within a threshold distance from the anchors;
  - providing the filtered subset as a set of samples representing the received transaction records to a sample consumer; and
  - training, by the sample consumer, a machine learning model to generate predictions about transaction records using the set of samples as training data.

20. The system of claim 19, wherein received transaction records are selectively added to the set of samples at each of multiple time points, and wherein the sample consumer updates the machine learning model at each of the multiple time points.

* * * * *